US009926986B2

(12) United States Patent
Hartz et al.

(10) Patent No.: US 9,926,986 B2
(45) Date of Patent: *Mar. 27, 2018

(54) CONNECT-DISCONNECT APPARATUS FOR A VEHICLE DRIVETRAIN

(71) Applicant: Allison Transmission, Inc., Indianapolis, IN (US)

(72) Inventors: James F. Hartz, Indianapolis, IN (US); Rick K. Daugherty, Clayton, IN (US); Rick L. Platt, Indianapolis, IN (US); Brian L. Pannell, Fortville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/947,105

(22) Filed: Nov. 20, 2015

(65) Prior Publication Data

US 2016/0076648 A1 Mar. 17, 2016

Related U.S. Application Data

(63) Continuation of application No. 14/332,944, filed on Jul. 16, 2014, now Pat. No. 9,309,931.

(51) Int. Cl.
*F16D 11/14* (2006.01)
*F16D 23/12* (2006.01)
(Continued)

(52) U.S. Cl.
CPC ............ *F16D 11/14* (2013.01); *B62D 55/125* (2013.01); *F16D 23/12* (2013.01);
(Continued)

(58) Field of Classification Search
CPC .... F16D 11/14; F16D 2011/004; F16D 23/12; F16D 2023/123; B62D 11/186;
(Continued)

(56) References Cited

U.S. PATENT DOCUMENTS 3,504,564 A * 4/1970 Kell .......................... F16H 1/28
192/69.9
4,040,312 A * 8/1977 Tappan et al. .......... F16H 47/04
475/342

(Continued)

OTHER PUBLICATIONS

Korean Intellectual Property Office. International Search Report and Written Opinion of the International Searching Authority issued in Application No. PCT/US2014/046866. dated Apr. 10, 2015. 11 Pages.

*Primary Examiner* — Richard M Lorence
(74) *Attorney, Agent, or Firm* — Taft Stettnius & Hollister LLP; Stephen F. Rost

(57) ABSTRACT

A connect-disconnect assembly for a vehicle drivetrain configured to drive a vehicle with a surface engaging traction member. The connect-disconnect assembly includes a coupler located within a final drive element or gear of a final drive assembly wherein in a first position the coupler does not span a gap between the gear and a transmission drive element of a transmission. In a second position, the coupler does span the gap between the gear and the transmission drive element such that the gear and the transmission drive element are connected. The final drive assembly includes an access port to provide access to a user accessible drive actuator to move the coupler between the first and second positions.

15 Claims, 4 Drawing Sheets

(51) Int. Cl.
 *B62D 55/125* (2006.01)
 *F16D 11/00* (2006.01)
(52) U.S. Cl.
 CPC .. *F16D 2011/004* (2013.01); *F16D 2023/123* (2013.01); *Y10T 74/19614* (2015.01)
(58) Field of Classification Search
 CPC ....... B62D 55/125; B60K 17/00–17/26; Y10T 74/19614
 See application file for complete search history.

(56) References Cited

U.S. PATENT DOCUMENTS

| | | | |
|---|---|---|---|
| 4,043,226 A | | 8/1977 | Buuck |
| 4,932,281 A | | 6/1990 | Ordo |
| 5,267,915 A | * | 12/1993 | Estabrook ............... F16D 11/14 192/69.4 |
| 9,309,931 B2 | * | 4/2016 | Hartz et al. .......... B62D 55/125 |
| 2002/0065156 A1 | | 5/2002 | Younggren et al. |
| 2002/0091036 A1 | | 7/2002 | Bott et al. |
| 2002/0125060 A1 | | 9/2002 | Cigal |

* cited by examiner

CONNECT-DISCONNECT APPARATUS FOR A VEHICLE DRIVETRAIN

RELATED APPLICATIONS

This application is a continuation application of U.S. patent application Ser. No. 14/332,944, filed Jul. 16, 2014, having the title "Connect-Disconnect Apparatus for a Vehicle Drivetrain", which is hereby incorporated by reference in its entirety.

FIELD OF THE DISCLOSURE

The present application relates to a powertrain assembly for a motor driven vehicle and more particularly to a transmission and a final drive assembly of a drivetrain of the motor driven vehicle.

BACKGROUND

Vehicles can have a prime mover, such as an engine, for producing power and a transmission assembly coupled to the prime mover to transmit the power to a driveline or to a final drive assembly. The final drive assembly moves a sprocket or drive hub that drives the vehicle along a surface. Such vehicles, in different configurations, include one or more surface engaging traction members such as wheels or tracks which are driven by the final drive assembly. In many configurations, the output of the transmission, typically a drive shaft, is connected to an input of the final drive assembly.

At some point during vehicle operation it may be desirable or necessary to maintain or service the transmission. To do so, the transmission can be removed from the vehicle. In other situations, it may be necessary to remove the drive assembly from the vehicle. In still other situations, it may be necessary to tow the vehicle from one location to another location for repair or service. In each of these situations, the output of the transmission is often disconnected from the drive assembly to perform the service. Alternatively, the final drive assembly can be completely removed from the vehicle, but removal can be extremely complex and can be extremely time consuming.

In some tracked vehicles, such as military vehicles, an access opening, such as a hatch, can be provided for a technician to access the output of the transmission so that the transmission output, wholly within the enclosed space, can be disconnected from the final drive assembly. While accessibility to the access opening may not require any special tooling, the amount of available space to perform the disconnection and connection of the transmission to the drive assembly is limited. In other instances, the design of the final drive assembly and sprocket for the track is such that there is either limited or no access through the final drive assembly by which to reach the transmission. A hatch may be required on the interior of the vehicle for access. In other situations, the final drive assembly may need to be disconnected from the power train and removed from the vehicle before the transmission can be serviced. Service in these conditions can require a substantial amount of time and effort.

What is needed, therefore, is a means for connecting and/or disconnecting a final drive assembly to or from a transmission output which thereby reduces the amount of time and labor required during maintenance, repair, or towing of a vehicle. Moreover, it is further desirable to provide a connect-disconnect mechanism that provides improved access to powertrain components.

SUMMARY

In accordance with one embodiment of the present disclosure, there is provided a means to either connect mechanical power transmitting shafts together or to disconnect the shafts, and thereby prevent the flow of mechanical power from one element to another. The connect-disconnect functions are accomplished without removing the power transmitting elements (engine, transmission, final drive) from the vehicle, and such functions can be quickly reversed and returned to a prior state. The features of a connect-disconnect apparatus provides axial motion of coupling components, and positively locates the coupling components in either the connected or disconnected conditions.

In another embodiment, there is provided a connect-disconnect assembly for a powertrain of a vehicle, having an engine, a transmission, and a final drive. In particular, the connect-disconnect assembly reduces the amount of time and effort to service or repair the powertrain. In addition, the amount of labor and time required to complete upgrades or modifications to the powertrain is also reduced.

In still another embodiment, there is provided a vehicle drivetrain configured to drive a vehicle with a surface engaging traction member. The drivetrain includes a transmission including a transmission coupler and a final drive assembly configured to drive the surface engaging traction member. The final drive assembly includes a drive element spaced from the transmission coupler to define a gap between the drive element and the transmission coupler. A coupling device is located at least partly within the drive element and coupled thereto. The coupling device, in a first position, does not span the gap such that the drive element and the transmission coupler are not connected by the coupling device. In a second position the coupling device extends from the drive element to the transmission coupler a distance sufficient to span the gap to thereby operatively connect the drive element to the transmission coupler.

In an additional embodiment, there is provided a connect-disconnect assembly for a vehicle drivetrain including a transmission having a drive element, and a final drive assembly configured to drive the vehicle with a surface engaging traction member and having a gear spaced from the drive element to define a gap. The assembly includes a coupler located at least partly within the gear and coupled thereto. The coupler in a first position does not span the gap such that the drive gear and the drive element are not connected by the coupler. In a second position, the coupler extends from the gear to the drive element a distance sufficient to span the gap to operatively connect the gear to the drive element. A drive actuator is operatively coupled to the coupler, wherein movement of the drive actuator moves the coupler along a longitudinal axis toward the drive element a distance sufficient to span the gap and to engage the gear to the drive element.

In a further embodiment, there is provided a method for disconnecting and connecting a transmission having a transmission drive element from a final drive assembly having a final drive element. The final drive element is spaced a distance from the transmission drive element to define a gap therebetween. The method includes disengaging a rotatable drive actuator from a rotatably fixed position to a rotatable position and rotating the rotatable drive actuator to move a coupler from a first position in which the coupler is disengaged from the transmission drive element to a second position in which the coupler is engaged with the transmission drive element.

BRIEF DESCRIPTION OF THE DRAWINGS

The above-mentioned aspects of the present application and the manner of obtaining them will become more apparent and the application itself will be better understood by reference to the following description of the embodiments of the application, taken in conjunction with the accompanying drawings, wherein.

Corresponding reference numerals are used to indicate corresponding parts throughout the several views.

DETAILED DESCRIPTION

The embodiments of the present application described below are not intended to be exhaustive or to limit the application to the precise forms disclosed in the following detailed description. Rather, the embodiments are chosen and described so that others skilled in the art may appreciate and understand the principles and practices of the present application.

In a general sense, the present disclosure relates to the control of torque transfer from one member to another. In one condition, a first member and a second member can be coupled or connected to one another such that torque can be transferred therebetween, and in a second condition the first and second members can be decoupled or disconnected from one another such that torque cannot be transferred therebetween. While this disclosure provides different examples of this control in a vehicular application, the disclosure is not intended to be limited to this application. One skilled in the art will appreciate varying aspects of the present disclosure outside of the vehicular application provided herein.

Figure 1:
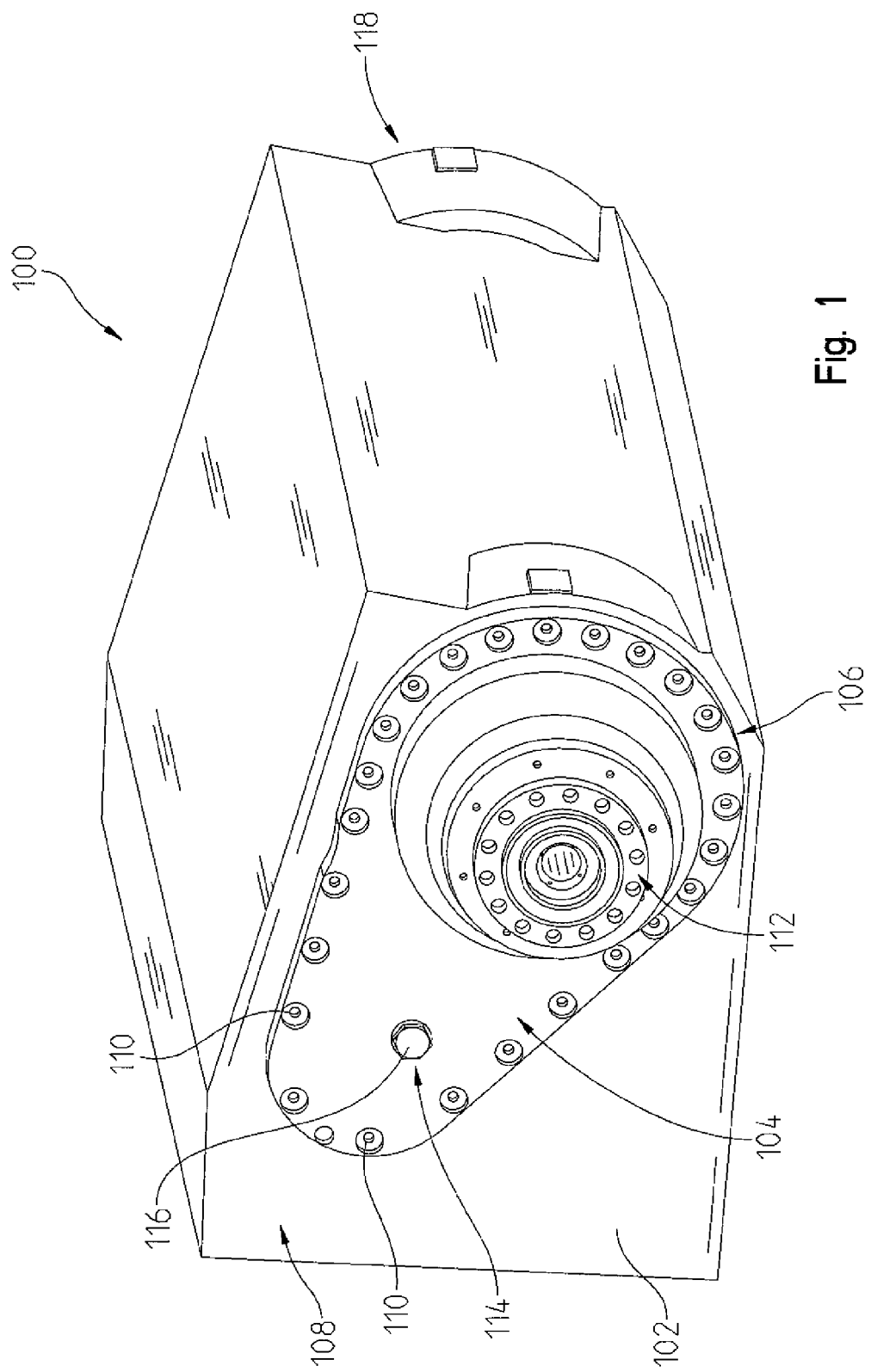
FIG. 1 is a partial perspective view of a tracked vehicle including a final drive supported by a body of the vehicle.

FIG. 1 illustrates one embodiment of a front portion of a machine or vehicle 100. In the illustrated embodiment a front portion of a tracked vehicle is shown without the tracks. The vehicle 100 includes a body or hull 102 configured to support the various assemblies and components of the vehicle including a final drive assembly 104. The final drive assembly 104 is located in a cavity 106 provided in a side 108 of the body 102. The final drive assembly 104 is held in the cavity 106 by a plurality of fasteners 110. The final drive assembly includes a drive hub 112 which is configured to support and to drive the track (not shown) of the vehicle 100. The drive assembly further includes a port 114 defining an aperture through which a connect-disconnect mechanism inside the final drive assembly 104 is operated. A cap 116 is configured to be inserted into the port 114 to cover the aperture and to substantially prevent the unwanted introduction of dirt or debris into the final drive assembly. The illustrated final drive assembly 104 is located on a right side of the vehicle. A second final drive assembly 118 (not shown) is located on a left side of the vehicle.

Figure 2:
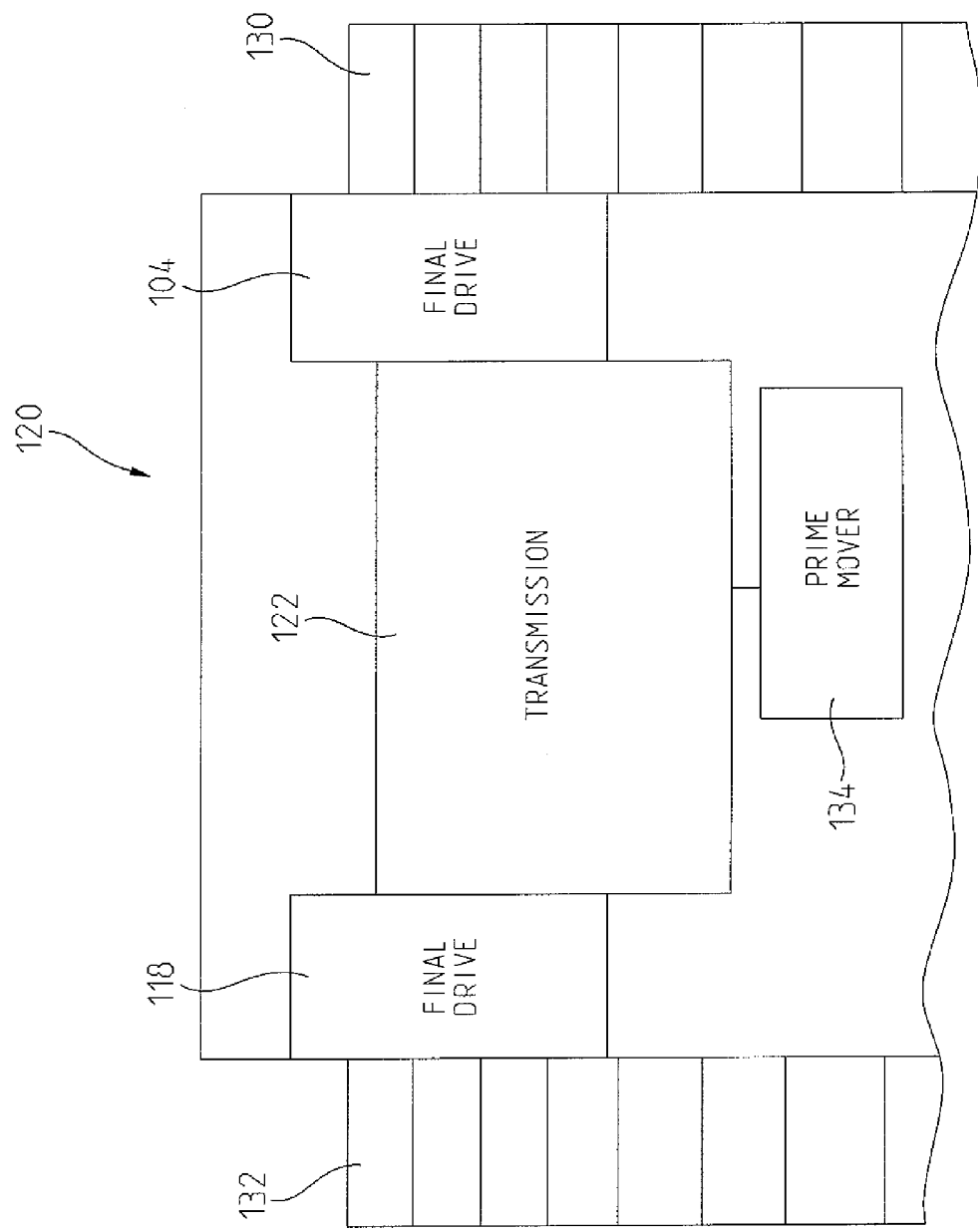
FIG. 2 is a schematic drawing of a front portion of a tracked vehicle including a transmission, final drives, and vehicle tracks.

FIG. 2 is a schematic drawing of a front portion 120 of the tracked vehicle 100 including a transmission 122. A transmission drive shaft (not shown) is operatively connected to the transmission 122 and to the final drive 104. The final drive assembly 104 is operatively connected to a first track 130, or surface engaging traction member, through the drive hub 112 of FIG. 1. The final drive assembly 118 is coupled to another side of the transmission 122 which is operatively connected to a second track 132. During operation of the vehicle 100, a prime mover 134, operatively coupled to the transmission 122, drives the tracks 130 and 132 by operation of the final drive assemblies 104 and 118, as would be understood by one skilled in the art.

Figure 3:
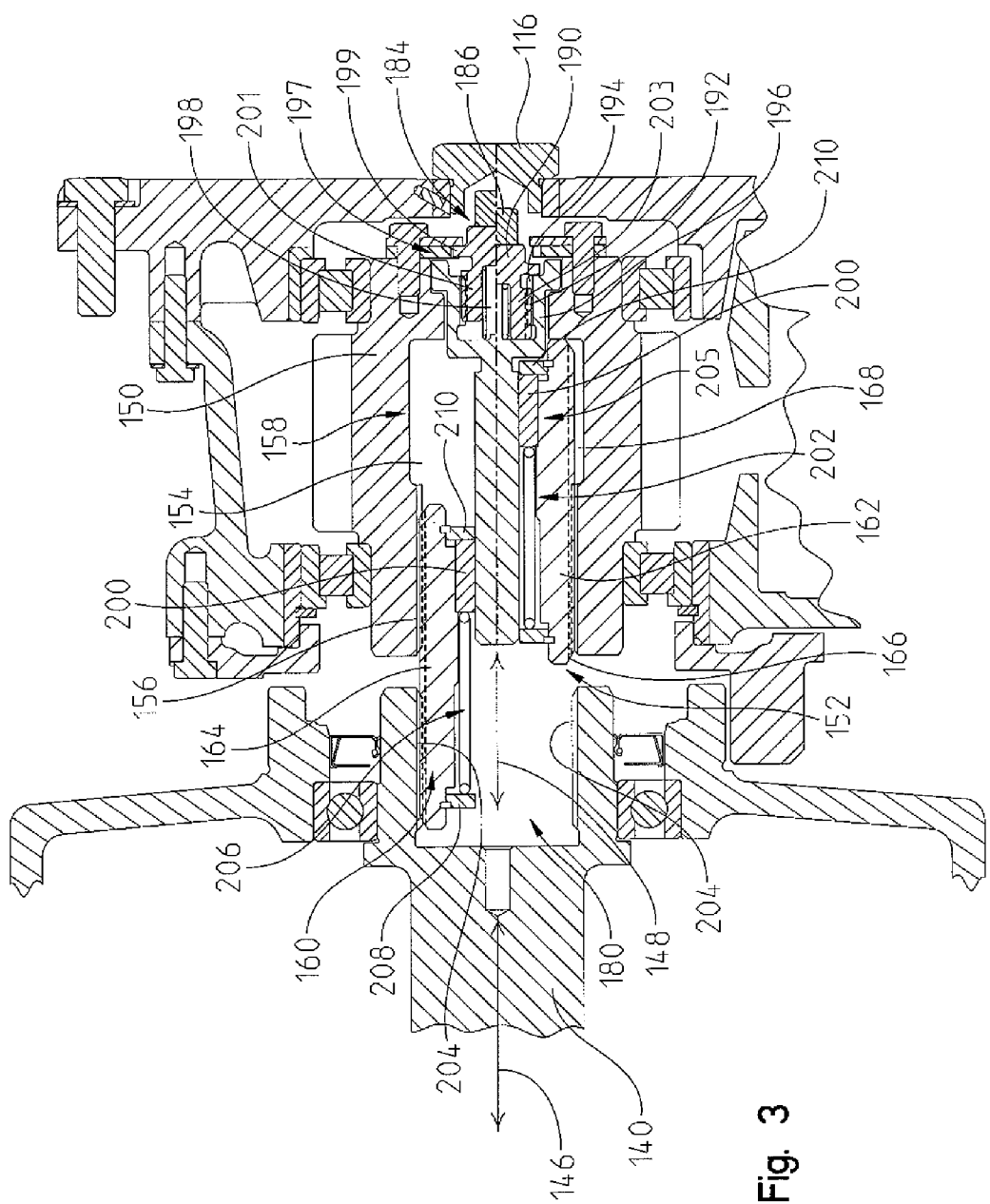
FIG. 3 is a schematic sectional view of a transmission drive element, a final drive assembly drive gear and a coupling device illustrated in first and second positions.

FIG. 3 illustrates a schematic sectional view of a portion of the final drive assembly 104 of FIG. 1 and of FIG. 2. While FIG. 3 illustrates the final drive assembly 104 illustrated on the right side of the vehicle 100 of FIG. 1, the final drive assembly 118, located on the left side of the vehicle is substantially the same configuration. Consequently, the discussion of final drive assembly 104 applies equally to the final drive assembly 118.

As seen in FIG. 3, the final drive assembly 104 is operatively connected to the transmission 122 through a transmission drive element 140. The transmission drive element 140 acts as a transmission coupler 140, or transmission output element, which couples the transmission output shaft to the final drive assembly 104. The transmission drive element 140 is operatively connected to the transmission drive shaft. Rotation of the transmission shaft, therefore, drives the transmission drive element 140 for rotation about a longitudinal axis 146 of the transmission shaft. The transmission drive element 140 serves as the output of speed and torque from the transmission and is preceded by elements of the transmission 122 which alter the speed and torque delivered to transmission drive element 140.

During initial installation of the final drive 104 to the hull 102, the final drive 104 is located in the cavity 106 and fixed to the hull by the connectors 110. The cavity 106 is located such that placement of the final drive 104 aligns a longitudinal axis 148 of a final drive element 150 with the longitudinal axis 146. In one embodiment, the final drive element is a gear. Once aligned, the final drive element 150 is positioned to be operatively connected to the transmission drive element 140 with a coupling device 152 which is located within a cavity 154 defined by final drive element 150. The cavity 154 is generally cylindrical and is defined within the final drive gears by an interior surface including splines 156 and a smooth surface 158. In one embodiment, the splined interior surface 156 extends along approximately one-half of the generally cylindrical cavity as illustrated. In other embodiments, the splines extend more or less than one half the length of the interior cavity 154 along the longitudinal axis 148.

The coupling device 152 includes a generally cylindrical final drive input shaft or coupling shaft 160 which is illustrated in a first position 162 and a second position 164. The coupling shaft 160 is located in the first position 162, which is a retracted or disconnected position, to enable installation of the transmission 122 in the vehicle. While the coupling shaft 160 appears to include two pieces in FIG. 3, the illustrated embodiment includes a single piece or unitary coupling shaft, a portion of which is shown in the first position 162 and a portion of which is shown in the second position 164. An exterior surface 166 includes splines 168 which extend along the length of the coupling shaft 160 and which engage the splines 156 of the final drive element 150.

Due to the cylindrical configuration of the coupling shaft 160, the splines are arranged circumferentially about the exterior surface of the shaft 160. The connection of the transmission 122 to either one of the final drives 104 or 118 is made by the coupling of shaft 160 to transmission drive element 140 and thence to the final drive component 150.

The coupling shaft 160 is configured to move longitudinally along the longitudinal axis 148 within the cavity 154 and longitudinally along the axis 146 into a generally circular cavity 180 defined by the transmission drive element 140. An interior surface of the transmission drive element 140 includes splines 204 which are configured to engage the splines 168 of the coupling shaft 160. Once the splines 168 of coupling shaft 160 fully engage the splines 204, a connection between the transmission shaft and the final drive element 150 is complete.

To fully engage the coupling shaft 160 to the transmission drive element 140, the coupling shaft 160 is driven along the longitudinal axis 148 by a drive actuator 184. The drive actuator 184 is driven by a tool (not shown) which interfaces with a head 186 accessible through the port 114. Removal of the cap 116 from the port 114 reveals an aperture which includes a size sufficient to enable the tool to engage the head 186. In one embodiment, the tool is a hex drive tool configured to engage a hex drive head.

The head 186 is operatively coupled to an actuator 190 including splines 192 configured to engage splines 194 of a driver 196, such as a drive screw. The actuator 190 further includes external splines which engage corresponding internal splines of a support structure 197 at an interface 199. Actuator 190 and driver 196 are always engaged through mating splines 192 and 194. Moving head/actuator 186/190 along axis 148 between first position 201 and second position 203 causes actuator spline 192 to slide longitudinally along mating driver spline 194 which is axially-stationary. The drive actuator 184 is shown in a first position 201 (the topmost position as illustrated) and a second position 203 (the bottommost position as illustrated). Engagement of the splines at the interface 199 in the first position 201 prevents rotation of the head 186. In this condition, the position of the actuator 190 is held by a resilient member 198, such as a spring, which directs the actuator 190 toward the right as illustrated. To allow the actuator 190 to rotate the driver 196, the tool which engages head 186 is moved longitudinally with pressure in the left direction as illustrated to compress the spring 198 and to disengage the splines of the actuator 190 from the splines of the support structure 197. In this position, the actuator 190 (the bottommost position 203 as illustrated) is rotatable. Rotation of the tool when the spring 198 is compressed, therefore, is not limited and rotates the actuator 190 and the driver 196 about the axis 148, which moves the coupling shaft 160 along the axis 148 for engagement with the transmission drive element 140. More specifically, as illustrated in FIG. 3, rotation of driver 196 moves the coupler/nut 200, which moves the coupling shaft 160, either through spring 206 if moving leftward to connect, or through a stop 210 in the rightward disconnect direction. In one embodiment, the spring is a cylindrical helical compression spring.

In the embodiment of FIG. 3, the driver 196 moves the coupling shaft 160 by movement of a coupler 200, also identified as a nut 200. The coupler 200 is disposed between the driver 196 and the coupling shaft 160. The driver 196 includes helical threads that engage helical threads of the coupler 200 at an interface 205. The coupler 200 is also locked circumferentially to the coupling shaft 160 by means of spline interface 202. The driver 196 is captured axially/longitudinally to restrict its translation to the left or right along axis 148. Since the coupler 200 cannot rotate relative to shaft 160 and the driver 196 cannot translate, then rotation of the driver 196 moves the coupler 200 toward the transmission drive element 140 such that engagement of the coupler with the coupling shaft 160 moves the coupling shaft 160 toward the transmission drive element 140 to engage the splines 168 with splines 204 of the transmission drive element 140. Upon completion of the engagement of the splines 168 with the splines 204, the transmission drive shaft is coupled to the final drive element 150 to drive the tracks 130.

Rotation of head/actuator 186/190 induces rotation of threaded shaft (driver) 196 by means of the sliding, but always engaged spline connection between mating splines 192 and 194. The driver 196 does not translate axially/longitudinally left or right as illustrated. The nut 200 translates left or right along the axis 148 by means of threads of the nut 200 and the shaft 196 at an interface 205.

A resilient member or spring 206 is located between the coupling shaft 160 and the driver 196. The spring 206 is compressed by the coupler 200 between a first stop 208 and coupler/nut 200. To accommodate compression of spring 206, the coupler can slide longitudinally along axis 148 at spline interface 202 without disengaging circumferentially from shaft 160. The stop 210 is loaded directly by movement of the nut 200 during disconnect (disengagement) of splined shaft 160 from the internally splined transmission output member 140. The spring 206 stores potential energy if coupling shaft 160 is not properly aligned with drive element 140, the misalignment of which prevents sliding spline engagement of splines 168 and 204. Alignment of the splines 168 and 204 is induced via relative rotation between the transmission drive element 140 and the shaft 160. Typically, slight circumferential rotation of drive element 140 enables the spring 206 to release energy after which snap action engagement occurs at the spline joint of drive element 140 and shaft 160. The final drive element 150 and the transmission drive element 140 move from a circumferentially misaligned position to an aligned position to enable the coupling shaft 160 and the transmission drive element 140 to fully engage.

Figure 4:
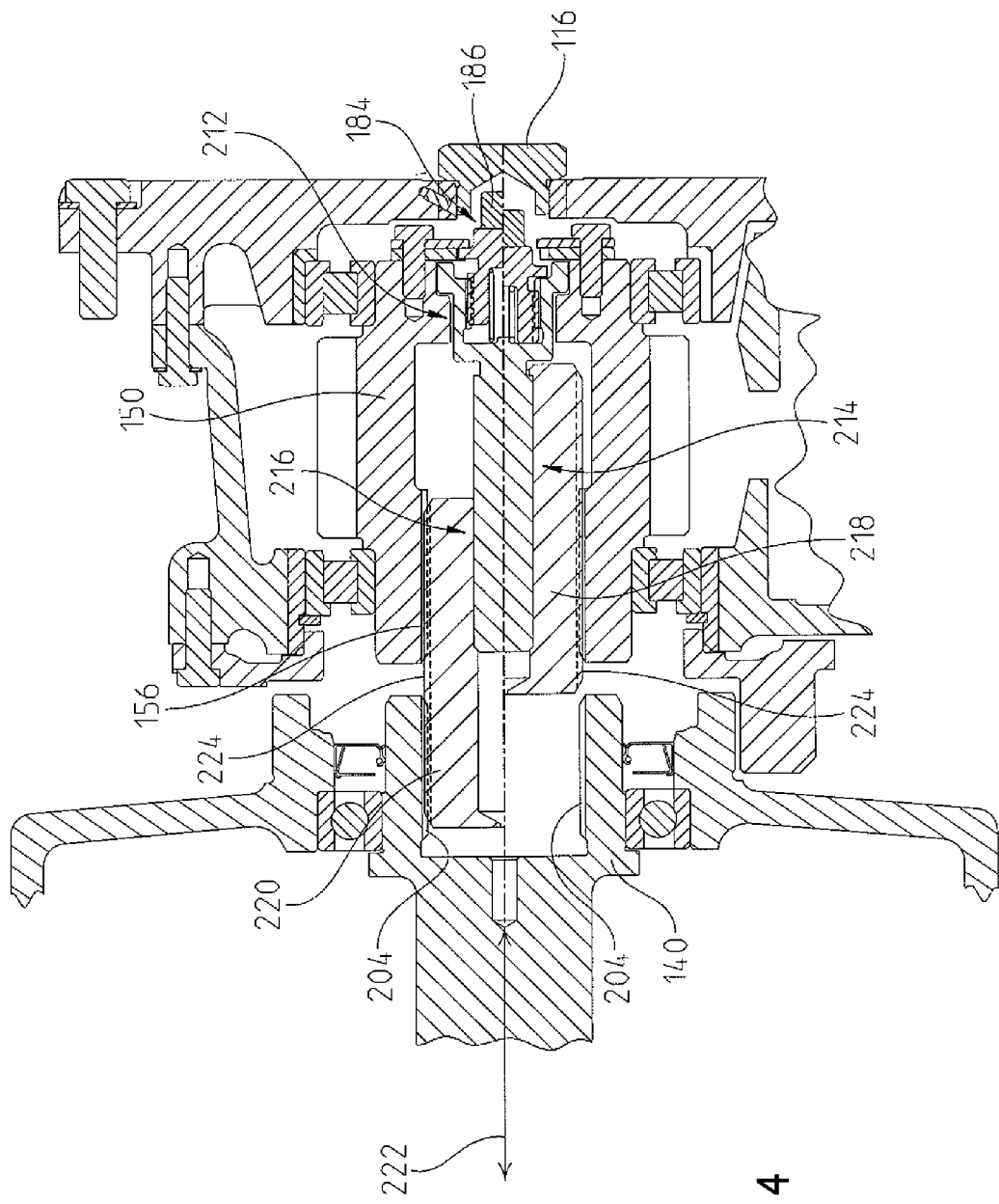
FIG. 4 is a schematic section view of a transmission drive element, a final drive assembly drive gear and a coupling device illustrated in first and second positions.

While the spring 206 assists in aligning the coupling shaft 160 with the transmission drive element 140, in another embodiment, as illustrated in FIG. 4, the drive actuator 184 does not include coupler 200, spring 206, first stop 208 and second stop 210. In this configuration, a driver 212, such as a drive screw, which is rotated by the head 186, includes helical threads engaging helical threads of a coupling shaft 214 at an interface 216. Rotation of the driver 212 therefore moves the coupling shaft 214 toward the transmission drive element 140. In this embodiment, an alignment assist mechanism is not included and consequently, connection and/or disconnection between the coupling shaft 214 and the drive element 140 is made by rotation of the head 186 which moves the coupling shaft 214 toward the drive element 140. Indexed alignment of coupling shaft 214 and drive element 140 is accomplished by circumferential movement (rotation) of either drive element 140 or final drive gear 150. Relative circumferential motion of drive element 140 and drive gear 150 can be made by starting the engine to provide motive power to the transmission's steer system, and providing a slight steer motion at the output shaft 140.

The illustration of FIG. 4 shows the coupling shaft 214 in a disengaged position 218 and a fully engaged position 220. As previously described with respect to FIG. 3, the coupling shaft is a generally cylindrical single piece or unitary coupling shaft. The coupling shaft 214 moves along a longitudinal axis 222. The coupling shaft 214 is located in the first position 218, which is a fully retracted or disconnected position, to enable installation of the transmission 122 in the vehicle. The coupling shaft 214, in the second position 220, is fully engaged with the transmission drive element. An exterior surface of the coupling shaft 214 includes splines 224 which extend along the length of the coupling shaft 214 and which engage the splines 156 of the final drive gear 150 and splines 204 of the transmission drive element 140.

Under certain conditions in which the vehicle 100 no longer moves under its own power, such as resulting from engine or transmission failure, the final drive gear 150 is disconnected (if connected) from transmission drive element 140. To disconnect the final drive gear 150 from the transmission drive element 140, the head 186 is rotated with a tool in a direction opposite to the direction previously used to connect the coupling shaft 160 or coupling shaft 214 to the transmission drive element 140. Once disconnected, the vehicle 100 is towed to another location where repairs can be made. After repair, the coupling shaft 160 or coupling shaft 214 is moved into engagement with the transmission drive element 140 to connect the final drive transmission drive gear 150 to the coupling shaft 140.

Connection of an output of a transmission to a vehicle mounted final drive or gearbox is generally independent of the installation of the transmission into the vehicle. Consequently, the present disclosure provides a simple and straightforward connection of power transmitting elements without damage after installation of the transmission is complete. Likewise, disconnection of the drive elements from one another to allow removal of the transmission or to facilitate towing of a disabled vehicle without incurring damage to inoperative drive elements is provided. In addition, the splined shaft 160 is positively locked in either the "connect" position (complete engagement of the drive shaft 160 with drive element 140) or the "disconnect position" (complete disengagement of the drive shaft 160 from the drive element 140). This disclosure provides all of these functions and features in a compact, simple, and robust mechanism.

While exemplary embodiments incorporating the principles of the present application have been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this application pertains and which fall within the limits of the appended claims.

What is claimed is:

1. A vehicle drivetrain configured to drive a vehicle with a surface engaging traction member, the drivetrain comprising:
   a transmission including a transmission coupler;
   a final drive assembly configured to drive the surface engaging traction member, the final drive assembly including a drive element spaced from the transmission coupler to define a gap between the drive element and the transmission coupler;
   a coupling device located at least partly within the drive element and coupled thereto, wherein the coupling device in a first position does not span the gap such that the drive element and the transmission coupler are not connected by the coupling device and in a second position extends from the drive element to the transmission coupler a distance sufficient to span the gap to thereby operatively connect the drive element to the transmission coupler; and
   a coupling shaft having a dimension sufficient to span the gap and a drive actuator operatively coupled to the coupling shaft;
   wherein, the drive actuator is configured to move the coupling shaft along a longitudinal axis of the coupling device a distance sufficient to span the gap and to engage the transmission coupler to the drive element; and
   wherein the drive actuator includes a user accessible drive having a biasing member disposed between the user accessible drive and the coupling shaft, wherein the biasing member includes a first position which prevents the coupling shaft from moving along the longitudinal axis and a second position which enables the coupling shaft to move along the longitudinal axis, wherein the biasing member includes a first condition to bias the user accessible drive in the first position and a second condition to bias the user accessible drive in the second position.

2. The vehicle drivetrain of claim 1, wherein the drive actuator includes a linear actuator member configured to move the coupling shaft along the longitudinal axis and which remains at a fixed location along the longitudinal axis during movement of the linear actuator member.

3. The vehicle drivetrain of claim 2, wherein the coupling shaft includes threads configured to engage the linear actuator member and the user accessible drive is configured to rotate the linear actuator member to move the coupling shaft along the longitudinal direction to connect and to disconnect the drive element to and from the transmission coupler.

4. The vehicle drivetrain of claim 2, wherein rotation of the user accessible drive in a first direction connects the drive element to the transmission coupler.

5. The vehicle drivetrain of claim 4, wherein rotation of the user accessible drive in a second direction disconnects the drive element from the transmission coupler.

6. The vehicle drivetrain of claim 2, wherein the user accessible drive includes a user interface disposed at an externally accessible location on the vehicle, to provide direct access to the user interface without disassembly of the drivetrain of the vehicle.

7. The vehicle drivetrain of claim 2, wherein the linear actuator member includes a drive screw configured to engage threads of a nut associated with the coupling shaft.

8. The vehicle drivetrain of claim 7, wherein the drive actuator includes a shaft biasing member disposed between the drive screw and the coupling shaft, the shaft biasing member configured to provide a biasing force to the coupling shaft along the longitudinal direction, wherein movement of the drive screw toward the drive element increases the biasing force in the event the coupling shaft and the drive element are circumferentially misaligned.

9. A connect-disconnect assembly for a vehicle drivetrain including a transmission having a drive element, and a final drive assembly configured to drive the vehicle with a surface engaging traction member and having a gear spaced from the drive element to define a gap therebetween, the assembly comprising:
   a coupler located at least partly within the gear and coupled thereto, wherein the coupler in a first position does not span the gap such that the drive gear and the drive element are not connected by the coupler, and in a second position extends from the gear to the drive element a distance sufficient to span the gap to operatively connect the gear to the drive element; and a drive actuator operatively coupled to the coupler, the drive actuator including a drive screw configured to operatively engage threads of a coupling shaft, wherein movement of the drive actuator moves the coupler along a longitudinal axis toward the drive element a distance sufficient to span the gap and to engage the gear to the drive element, wherein the drive actuator includes a shaft biasing member disposed between the drive screw and the coupling shaft, the shaft biasing member configured to provide a biasing force to the coupling shaft along the axial direction, wherein movement of the drive screw toward the drive element increases the biasing force in the event the coupling shaft and the drive element are circumferentially misaligned.

10. The assembly of claim 9, wherein the drive actuator includes user accessible drive operatively connected to the drive screw, the accessible drive including a first position which prevents the drive screw from moving the coupling shaft along the longitudinal axis and a second position which enables the drive screw to move the coupling shaft along the longitudinal axis.

11. The assembly of claim 10 wherein the user accessible drive includes a drive biasing member disposed between a portion of the user accessible drive and the drive screw, wherein the drive biasing member includes a first condition to bias the user accessible drive in the first position and a second condition to bias the driver in the second position.

12. A method for disconnecting and connecting a transmission having a transmission drive element from a final drive assembly having a final drive element spaced a distance from the transmission drive element to define a gap therebetween, the method comprising:

disengaging a rotatable drive actuator from a rotatably fixed position to a rotatable position;

rotating the rotatable drive actuator to move a coupler from a first position in which the coupler is disengaged from the transmission drive element to a second position in which the coupler is engaged with the transmission drive element, and biasing a shaft biasing member configured to provide a biasing force to the coupler, wherein movement of the coupler toward the transmission drive element increases the biasing force in the event that the coupler and the transmission drive element are circumferentially misaligned.

13. The method of claim 12 wherein rotating the rotatable drive actuator includes rotating the drive actuator to move the coupler along a path defined by a longitudinal axis of the transmission drive element.

14. The method of claim 12 further comprising engaging the rotatable drive actuator at the rotatably fixed position after the coupler is disengaged from the transmission drive element.

15. The method of claim 14 wherein disengaging the rotatable drive actuator includes moving the rotatable drive actuator along the path defined by the longitudinal axis of the transmission drive element.

* * * * *